(12) United States Patent
Davis et al.

(10) Patent No.: US 6,811,697 B2
(45) Date of Patent: Nov. 2, 2004

(54) APPARATUS AND METHOD FOR EXTRACTING PARTICLES FROM A FLUID STREAM

(75) Inventors: Robert J. Davis, Lenaxa, KS (US); John K. Kelly, Lenaxa, KS (US); Frank G. Weis, Lenaxa, KS (US)

(73) Assignee: Smith & Loveless, Lenexa, KS (US)

( * ) Notice: Subject to any disclaimer, the term of this patent is extended or adjusted under 35 U.S.C. 154(b) by 259 days.

(21) Appl. No.: 10/014,381

(22) Filed: Oct. 26, 2001

(65) Prior Publication Data

US 2003/0085164 A1 May 8, 2003

(51) Int. Cl.⁷ .......................... B01D 21/24; B01D 21/26
(52) U.S. Cl. .................... 210/512.1; 210/456; 210/519; 210/523; 210/532.1
(58) Field of Search ................................ 210/456, 512.1, 210/519, 523, 532.1; 209/722, 725

(56) References Cited

U.S. PATENT DOCUMENTS

| 3,941,698 A | 3/1976 | Weis |
| 4,107,038 A | 8/1978 | Weis |
| 4,767,532 A | 8/1988 | Weis |

*Primary Examiner*—John Kim
(74) *Attorney, Agent, or Firm*—Wood, Phillips, Katz, Clark & Mortimer

(57) ABSTRACT

A grit extractor includes inlet and outlet flumes arranged to inject and extract liquid tangentially into a round chamber. The velocity entering and leaving the chamber is controlled by the width of the outlet flume. The velocity is maintained within an optimal region over a ten to one flow range. An effective ten to one variation in flow is achieved with a velocity in the range of 1.5 feet per second to 3.5 feet per second.

21 Claims, 3 Drawing Sheets

APPARATUS AND METHOD FOR EXTRACTING PARTICLES FROM A FLUID STREAM

TECHNICAL FIELD OF THE INVENTION

The present invention relates to an extracting device that uses the flow of the liquid through a hydraulic system for removing grit or other particles from a solid-laden liquid.

BACKGROUND OF THE INVENTION

A known grit extractor apparatus for liquid sewage includes inlet and outlet troughs or flumes connected to a round settling chamber. This type of apparatus has a typical flow rate turn down ratio of about four to one.

In the known grit extractor apparatus, flow velocity is a critical factor in determining turn down ratio. The flow velocity must be maintained between about 1.5 feet per second to about 3.5 feet per second. A flow velocity below 1.5 feet per second will tend to allow grit to settle in the extractor troughs where it is difficult to remove by the flow stream. As a result, the troughs have to be manually cleaned. For a flow velocity above 1.5 feet per second, the flow is turbulent. When the flow is too turbulent, at velocity above 3.5 feet per second, the grit will not move to the bottom of the flow stream where it can effectively attach to the bottom of the chamber, and will not remain on the bottom of the chamber to be moved to a central grit storage chamber.

Grit extractor apparatus are disclosed in U.S. Pat. Nos. 4,767,532; 4,107,038; and 3,941,698. The grit extractor apparatus of these patents introduce the liquid and grit into a round chamber wherein the resultant hydraulics within the chamber control the degree of grit removal. There is a natural tendency in these extractor apparatus for the hydraulic flow to pass from the influent to the effluent as rapidly as possible. This tendency results in some short circuiting across the chamber, especially at low flows, resulting in less than optimum grit removal. The effluent flow from the round chamber is over a broad area. The outflow has a large radial vector that results in decreasing the circular velocity, due to being at right angles to the circular flow. Reduced circular velocity can result in inefficient velocity to move grit, causing grit buildup on the floor of the chamber, especially at low liquid flow rates.

There is little control of liquid flow velocity entering the chamber, as flow velocity is a function of flume width, which is a set dimension, the quantity of liquid flowing, and the height of the liquid flowing in the flume. If the velocity is too great, the grit is uniformly suspended or distributed in the flow. Uniform distributed grit is harder to recover. If the level in the inlet or influent flume is raised, by elevating the level of the outlet or effluent flume, the velocity at low flows will be low and cause grit accumulation in the chamber or in the influent flume. Because of these design restraints, a typical four to one turn down ratio is a design limitation.

The present inventors have recognized the desirability of providing a grit extractor apparatus that is designed for future anticipated higher flow rates, and yet be able to effectively operate for present day smaller flow rates. For example, if a difference in daily peak flow to minimum daily flow is about three to one to four to one, it is understandable that a future peak or maximum flow rate incorporated into a design may be projected to a larger amount, such as twice as large as the present maximum flow rate, such that the turn down ratio from the present minimum flows to the future maximum or peak flows will be six to one to eight to one.

The present inventors have recognized the desirability of reducing the area or "footprint" of such extractor apparatus to fit the apparatus inside existing buildings, to install larger extractor apparatus in the same space that an existing extractor apparatus occupies, or in order to minimize space in a new plant.

SUMMARY OF THE INVENTION

A grit extractor apparatus according to the present invention achieves optimum grit removal by using hydraulic currents to rotate grit-laden liquid so the grit comes in contact with the bottom of the grit removal chamber at a sufficiently slow velocity to be deposited on the bottom. The velocity is sufficiently fast such that hydraulic currents generate a moving force that gently pushes the grit along the floor of the chamber to the center where the grit is collected in a storage chamber for removal.

The present invention incorporates novel structure to control the flow of liquid and grit within a circular chamber and within inlet and outlet troughs or flumes. The flow velocity entering and leaving the chamber is controlled by the width of the entrance of the outlet flume. The velocity is controlled over a ten to one flow range by the novel use of hydraulic phenomena of the fluid level entering a narrow flume. According to the present invention, a ten to one variation in flow is achieved with an effective flow velocity in the range of 1.5 feet per second to 3.5 feet per second.

Hydraulic control of flow velocity is incorporated inside of the grit chamber instead of outside of the chamber, as in existing grit removal devices. This feature reduces the area that the unit occupies and greatly reduces the installation footprint. The grit extractor apparatus of the invention increases efficiency of grit removal.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
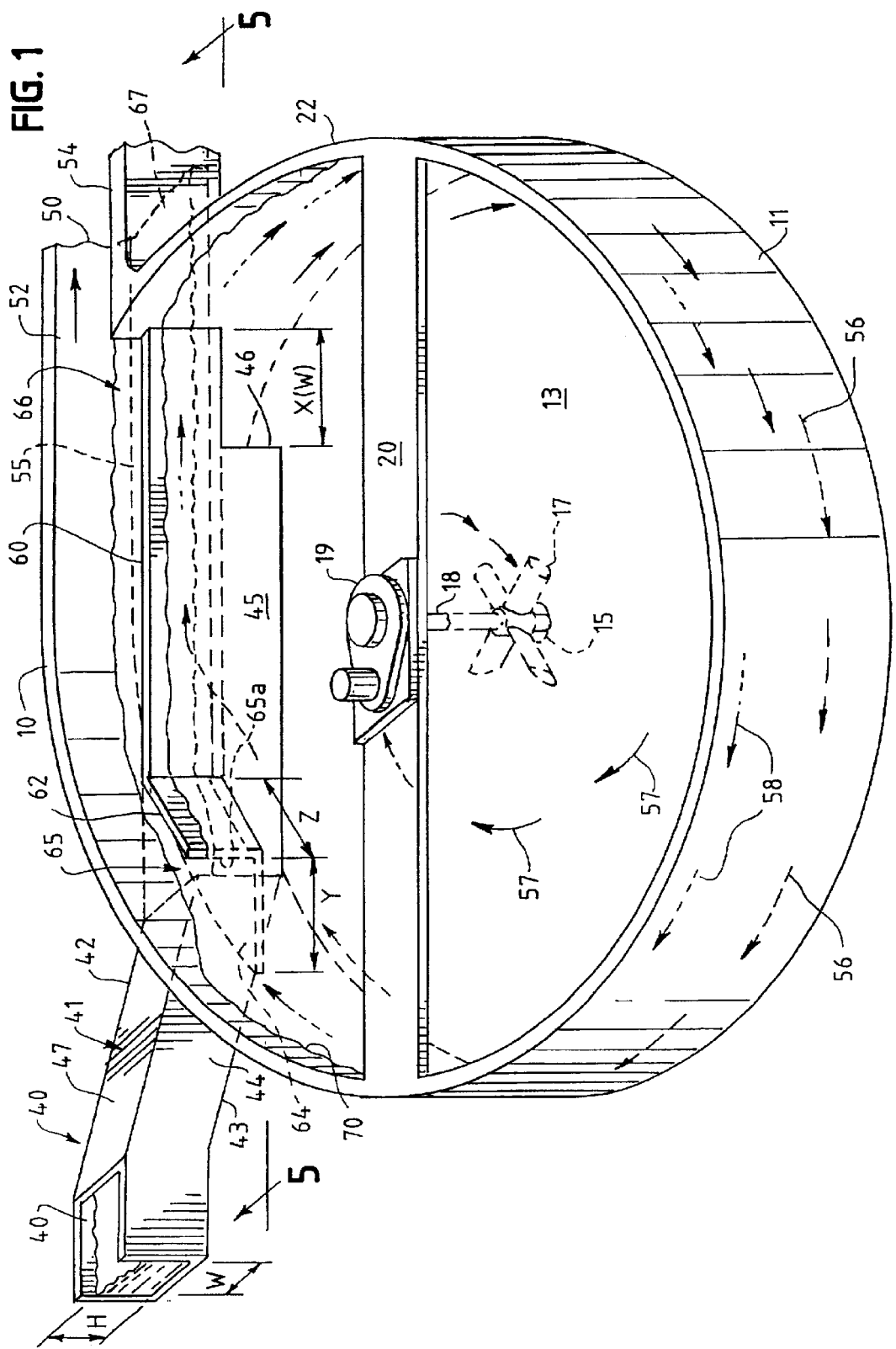
FIG. 1 is a schematic sectional view of a grit extractor apparatus of the present invention.

While this invention is susceptible of embodiment in many different forms, there are shown in the drawings, and will be described herein in detail specific embodiments thereof, with the understanding that the present disclosure is to be considered as an exemplification of the principles of the invention and is not intended to limit the invention to the specific embodiments illustrated.

Figure 3:
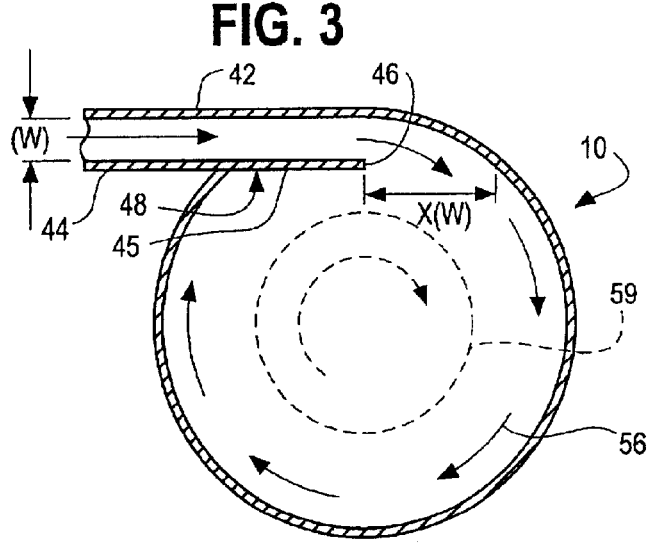
FIG. 3 is a schematic plan view of a lower level of the apparatus of FIG. 1.
Figure 4:
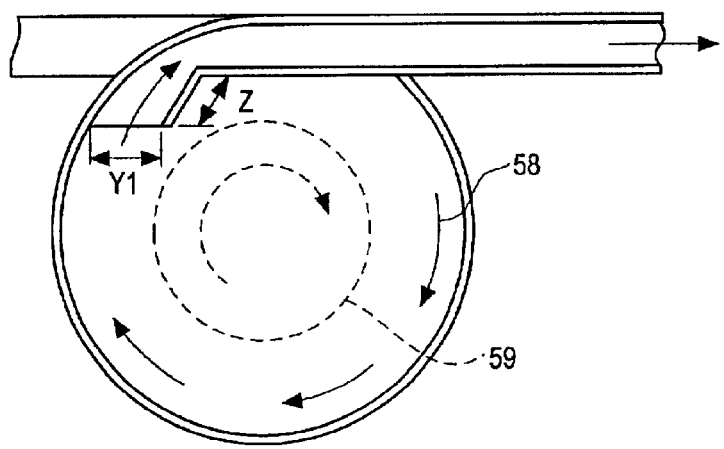
FIG. 4 is a schematic plan view of an upper level of the apparatus of FIG. 1.
Figure 5:
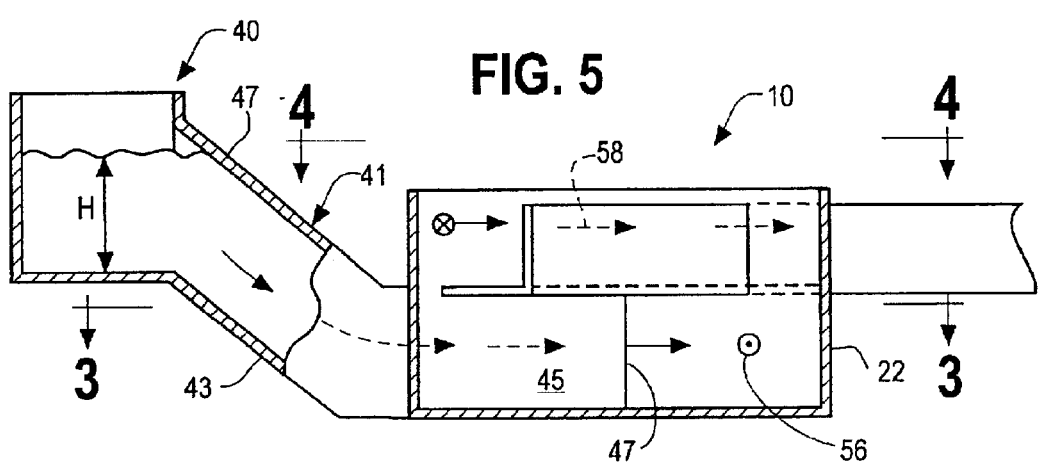
FIG. 5 is a schematic sectional view taken along line 5—5 of FIG. 1.

FIG. 1 illustrates an apparatus 10 for separating grit from grit-laden liquid 71 entering the apparatus. An inlet trough 40 has an inlet conduit 41 that conveys the liquid 71 downwardly at a slight angle. The conduit 41 turns to the horizontal adjacent to a grit removal chamber 11. At the intersection of the chamber 11, a trough bottom 43 is at the same elevation as a bottom 13 of the grit removal chamber 11. One vertical wall 42 of the conduit 41 is tangent to a wall 22 of the chamber 11 where the wall 42 terminates. A vertical wall 44 is parallel to the wall 42 and enters the chamber wall 22 at an inlet location 48 (shown in FIG. 3). A wall 45 extends across the chamber 11 to an inlet opening 46 where the grit-laden liquid enters chamber 11, flowing circumferentially around the wall 22 of the chamber. A top 47 of the conduit 41 is parallel to the bottom 13 and becomes the bottom of an effluent flume 55 that extends across the chamber 11. An influent tunnel is formed by the top 47, the wall 45, the floor 13 and the wall 22.

One example of a grit removal chamber includes an 18 foot diameter, 9 foot tall wall 22 for a 30 million gallons per day flow rate.

The grit-laden liquid flows from the opening 46 around the inside perimeter of the chamber 11, forming a lower channel of flow 56 as shown by the dashed arrows. The liquid at the wall 22, being of slightly higher head resulting from centrifugal force, flows down the wall 22 to the bottom 13, across the floor 13 to a center hole 15. The radial velocity component along with the rotation velocity, results in a spiral movement of flow 57 shown by the "G-arrows". The grit in this liquid comes in contact with the floor as the liquid is forced into a thin film, spread across the floor 13. The grit contacts the floor and is deposited on the floor. The spiral movement of flow 57 moves the grit across the floor 13 to the center hole 15.

A paddle 17, driven by a gear drive 19 and a drive shaft 18, rotates at a faster rotary speed than the surrounding liquid. The result is a pumping action across the floor 13, upward from the paddle, inducing additional pushing action on the grit. There is sufficient velocity to convey the lighter organics upward through the paddle to the surface. The flow moves across the surface of the liquid in the same manner as the centrifugal force, reinforcing the centrifugal force. The grit moves across the floor, drops down the center hole 15 into the grit storage chamber below (not shown). The bottom 13 may be flat or sloped downwardly toward the center hole. The grit storage chamber and grit removal apparatus can be as disclosed in U.S. Pat. Nos. 4,767,532; 4,107038 or 3,941,698, all herein incorporated by reference.

The liquid, less the grit, flows in the lower channel of flow 56 around the inside periphery of the apparatus adjacent to the wall 22. The wall 45 and the shelf 64 operate in unison to define the upper and lower channels of flow 56, 58 flowing around the shell inside perimeter. The lower channel of flow 56 flows under a shelf 64 and is deflected by the wall 45. Trapped between the shelf 64, the wall 22, the floor 13, and a more slowly rotating inner cylinder of liquid 59, the lower channel of flow 56 is forced upwardly. The channel of flow is now in the upper half of the liquid height, forming an upper channel of flow 58 that flows around an upper perimeter of the chamber adjacent to the wall 22, as shown by the dotted arrows.

The upper channel of flow 58 flows into an outlet opening 65a formed by a flume 65 defined by the wall 22, a wall 62, and a floor 64. The width Y of an opening 65a into the flume is narrower than the entrance width W of the inlet trough 40. This narrower opening results in a higher liquid level in grit removal chamber 11 to force the incoming flow through the more narrow opening 65a. The liquid flows through the flume 65 into an exit flume 66 defined by a wall 52 extended from the wall 22, a wall 60 and a floor 67. The flow then exits the apparatus to a further apparatus or other destination (not shown).

To operate at optimum performance, it is necessary to have influent velocity between about 1.5 feet per second and 3.5 feet per second at all process flows. In this flow range, the larger grit settled out of the flow stream will move along the bottom and smaller grit in the flow stream will be in heavier concentration near the bottom. Within this velocity range the grit will be easier to remove as it is already on or near the bottom of the flow stream. If the flow velocity is too low, however, the heavy grit settled on the bottom will not be moved along the bottom. This results in grit accumulating in the inlet flumes and not in the chamber. If the velocity is too high, the grit will be mixed as a heterogeneous flow, making it difficult to attach to the floor of the chamber. The result is poor removal efficiency. The velocity range of 1.5 feet per second to 3.5 feet per second has been determined to be an effective operating range.

Figure 2:
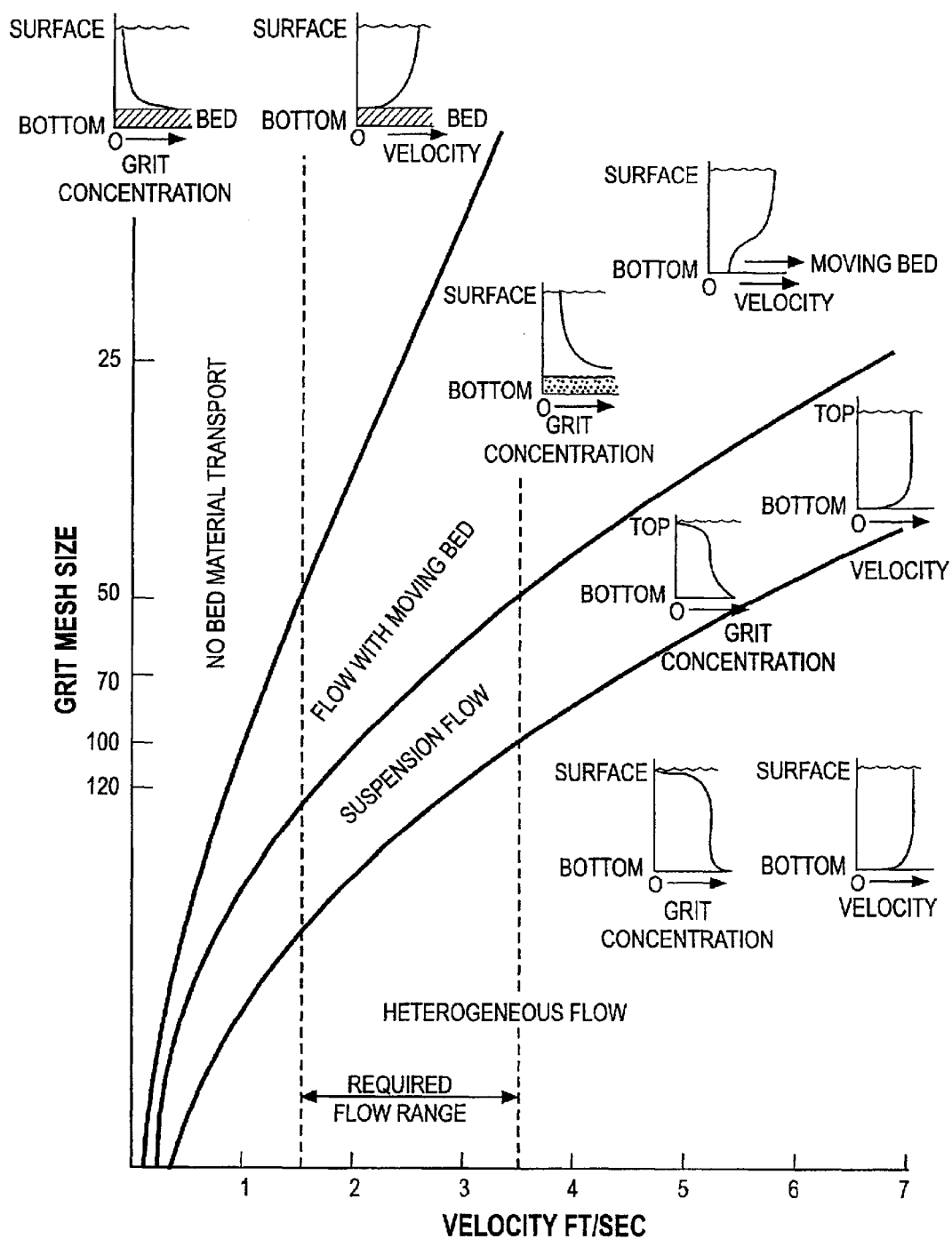
FIG. 2 is a graphical depiction of flow stream curves.

FIG. 2 shows the relation of various grit sizes in the flow stream at various velocities. Liquid velocity between 1.5 feet per second and 3.5 feet per second yields the optimum settling and bed flow for grit sizes most likely present in large quantity in sewage water.

To control the inlet velocity, the dimension Y of the flume 65 can be varied. This controls the depth of liquid 70 in the grit chamber 11, which reflects back to the height H of liquid in the influent trough 40. The entrance width W of the influent trough 40 is fixed for a certain flow unit. If H is varied in proper flow ratio, the influent flow will remain within the prescribed velocity range at the various flows.

The height of the flow entering the flume 65 varies per the following formula:

$$H = (Q/3.09Y)^{2/3}$$

$$U = \frac{Q}{WH}$$

where Q=flow in feet$^3$ per second
Y=width of flume in feet
U=velocity in feet per second
W=width in feet
H=height in feet The opening 46 controls the influent velocity into the grit removal chamber 11. The opening height is the same as the height of the wall 44. The width of the opening is:

X(W) where X is a percent and

W is the width of influent in feet, and

X is 65 to 85%, preferably 75%

By bringing the influent flow through the restricted inlet opening 46 adjacent to the wall 22 at the proper velocity, the channel of flow 56 is formed passing around the inside perimeter of the grit chamber 11. The upper channel of flow 58 further defines and confines the channel of flow 56 around the inside periphery of the wall 22.

The presence of the two channels of flow 56, 58 forces the liquid to rotate around the chamber 11 twice before exiting, giving more opportunity for grit removal. As both channels of flow 56, 58 are turning at the same speed, they do not intermix. The shelf 64, the wall 22 and the wall 62 separate the flow leaving the chamber 11 without creating any significant turbulence in the chamber 11.

The upper and lower channels of flows 56, 58 have approximately the same dimension flowing around the inside perimeter of the wall 22. The top 47 of the tunnel causes the flow to move out in a straight manner like a nozzle. The upper rotating formed channel of flow 58 moves over the entering liquid that forms the lower channel of flow 56. This prevents back eddy currents at the top of the lower channel of flow 56. The result is the liquid entering the chamber 11 remains as a formed lower channel of flow 56.

As this of flow channel 56 rotates around the inside perimeter of the wall 22, it slides under the bottom 64 of the exit flume 65. This prevents flow from stripping off the top of the formed channel 56. The prevention of stripping is caused by the projection Z of the exit flume 65. The dimension Z should vary from 2 feet on small units to 3 feet on large units.

The projection Z also confines the rotating channel 58, that is formed clockwise past the flume 65, to the dimension of the formed channel entering the flume 65. In this regard, the perimeter wall 22 acts like the bottom of a channel. The floor 13 of the chamber 11 acts like the side of a channel. The bottom 64 of the flume 65 acts like the side of a channel. These barriers force the channel of flow 56 to move past the flume 65 and be forced upward by walls 45 and 60 to form the top rotating channel of flow 58 with a minimum of dimensional change.

The upper formed channel of flow 58 moves around the wall 60 and the perimeter wall 22 to the exit flume 65 at approximately the same velocity and dimension as the lower formed channel of flow 56. Each formed channel of flow is about half the depth of the chamber 11.

The velocity entering and leaving the chamber is controlled by the width Y of the flume 65. This velocity is controlled over a 10 to 1 flow rate by the novel use of hydraulic phenomena of the liquid level entering a narrow flume being in the ratio of $H=(Q/3.09Y)^{2/3}$.

As an illustration of turn down ratio, two flow rates into the flume 40 are described below:

| | |
|---|---|
| Q = 46.42 feet$^3$ per second | Q = 4.64 feet$^3$ per second |
| Y = 3 feet | Y = 3 feet |
| H = 2.93 feet | H = 0.63 feet |
| U = 46.42/2.5 (2.93) = 3.5 ft. per sec. | U = 4.64/4.5 (0.63) = 1.6 ft. per sec. | both for a 4½ ft. wide inlet. For this 10 to 1 turn down in flow rate, the velocity remains in the required range of 1.5 feet per second to 3.5 feet per second.

In the prior calculation, at peak flow, the width Y of the flume is 3 feet, the height of flow exiting is 2.93 feet, giving a wetted area of 8.79 square feet. The velocity passing out of the flume 65 at peak flow of 46.42 ft$^3$/sec. is 46.42/8.79= 5.3 ft/sec. The velocity passing out at minimal flow is 4.64/3 (0.63) ft$^3$l/sec.=2.5 ft/sec. These high exit velocities into the opening 65a of the flume 65 tend to draw the liquid around the perimeter wall 22 to form the channel 58 flowing at this velocity. The inlet opening 46 into the chamber has typically about the same width X(W): (0.75) (4.5)=3.4 ft as the exit flume 65. This common width forms the channel flow velocity (2.5+0.42)/2=1.5 ft/sec. flowing around the perimeter. At the lowest flow, the velocity of the formed channel is about the average of the inlet and outlet velocity. At the minimum, it is readily seen that the velocity in the chamber never drops below the minimum velocity, to keep grit moving at sufficient velocity.

The height of the liquid rotating in the chamber 11 reduces as the influent flow decreases. The decrease in height at ⅒ maximum flow is almost one half. This means that there is less mass of liquid to rotate. A smaller mass results in less velocity of incoming liquid required to keep rotational velocity. This is demonstrated by the fact that at a drop of inlet velocity to ⅒ maximum velocity, the rotational speed only drops to about one half of maximum required velocity of 3.5 feet per second to 1.6 feet per second rotational velocity.

From the foregoing, it will be observed that numerous variations and modifications may be effected without departing from the spirit and scope of the invention. It is to be understood that no limitation with respect to the specific apparatus illustrated herein in tended or should be inferred. It is, of course, intended to cover by the appended claims all such modifications as fall within the scope of the claims.

What is claimed is:

1. An apparatus for removing solid particles from a liquid, comprising:
    a substantially round shell having an inlet located within said shell and an outlet located within said shell, said outlet being elevated from said inlet, said shell defining a particle extraction area;
    an outlet flume extending from said outlet and having a floor overhanging at least a portion of the particle extraction area; and
    a particle collection area located centrally of said particle extraction area;
    wherein said inlet includes a substantially vertical inner wall that extends upwardly a distance within said shell so as to direct liquid tangentially into said shell and substantially preclude communication between the liquid in the inlet and the liquid in the particle extraction area.

2. The apparatus according to claim 1, wherein said outlet is configured to receive liquid tangentially from an inside perimeter of said shell.

3. The apparatus according to claim 1 wherein said inlet is located within said shell and said apparatus comprises an inlet flume extending upstream from said inlet and penetrating said shell and having a bottom substantially at a same elevation as a bottom of the particle extraction area.

4. The apparatus according to claim 3, wherein said inlet flume comprises a tunnel extending into said particle extraction area from an inside of said shell to a said inlet.

5. The apparatus according to claim 4, wherein said outlet flume extends inside the shell supported on said tunnel.

6. The apparatus according to claim 1, wherein said inlet and said outlet are arranged for tangential fluid flow with respect to said shell.

7. The apparatus to claim 6, wherein said outlet comprises an outlet opening to said outlet flume located inside said shell, said outlet opening having a bottom floor located at an elevation substantially at a mid elevation of said shell.

8. The apparatus according to claim 7, wherein said inlet is connected to an inlet tunnel within the shell having a top plate located at an elevation substantially at a mid elevation of said shell.

9. The apparatus according to claim 1, comprising a floor connected around a bottom of said shell, said floor sloping toward said particle collection area.

10. The apparatus according to claim 1, wherein said vertical inner wall maintains a substantially straight flow within the inlet and directs the flow of liquid in a portion of the shell adjacent thereto to be substantially parallel to the inlet flow so that as the inlet flow enters the shell without substantial mixing with the liquid flow in the shell and forces the flow of liquid upwardly over the flow of liquid from the inlet.

11. An apparatus for removing solid particles from a liquid, comprising:
    a substantially round shell having an inlet located within said shell and an outlet located within said shell, said outlet being elevated from said inlet, said shell defining a particle extraction area;

an outlet flume extending from said outlet and having a floor overhanging at least a portion of the particle extraction area; and a particle collection area located centrally of said particle extraction area;

wherein said outlet flume includes a vertical inner wall that extends upwardly a distance within said shell so as to separate the liquid flow in the outlet flume from the circulating liquid in the particle extraction area so as to preclude said circulating liquid from entering said outlet flume.

12. The apparatus according to claim 11, wherein said inlet is configured to direct liquid tangentially into said shell.

13. The apparatus according to claim 11, wherein said outlet is configured to receive liquid tangentially from an inside perimeter of said shell.

14. The apparatus according to claim 11, wherein said apparatus comprises an inlet flume connected to said inlet and penetrating said shell, and said inlet flume having a bottom substantially at a same elevation as a bottom of the particle extraction area.

15. The apparatus according to claim 14, wherein said inlet flume comprises a tunnel extending into said particle extraction area from an inside of said shell to said inlet.

16. The apparatus according to claim 15, wherein said outlet flume extends inside the shell supported on said tunnel.

17. The apparatus according to claim 11, wherein said inlet and said outlet are arranged for tangential fluid flow with respect to said shell.

18. The apparatus according to claim 17, wherein said outlet comprises an outlet opening to said outlet flume located inside said rounded shell, said outlet opening having a bottom floor located at an elevation substantially at a mid elevation of said shell.

19. The apparatus according to claim 18, wherein said inlet is extended by an inlet tunnel within the shell having a top plate located at an elevation substantially at a mid elevation of said shell.

20. The apparatus according to claim 11, wherein said floor is sloped toward said particle collection area.

21. The apparatus according to claim 11, wherein said outlet flume further includes a wall portion at the opening thereof into said shell that is angled to shear off liquid circulating in said shell.

* * * * *